March 12, 1968  H. E. KENNEDY  3,373,099
PROCESS OF CRACKING LIQUID HYDROCARBONS IN AN
ELECTRIC ARC USING LIQUID METAL ELECTRODES
Filed March 24, 1965  3 Sheets-Sheet 3

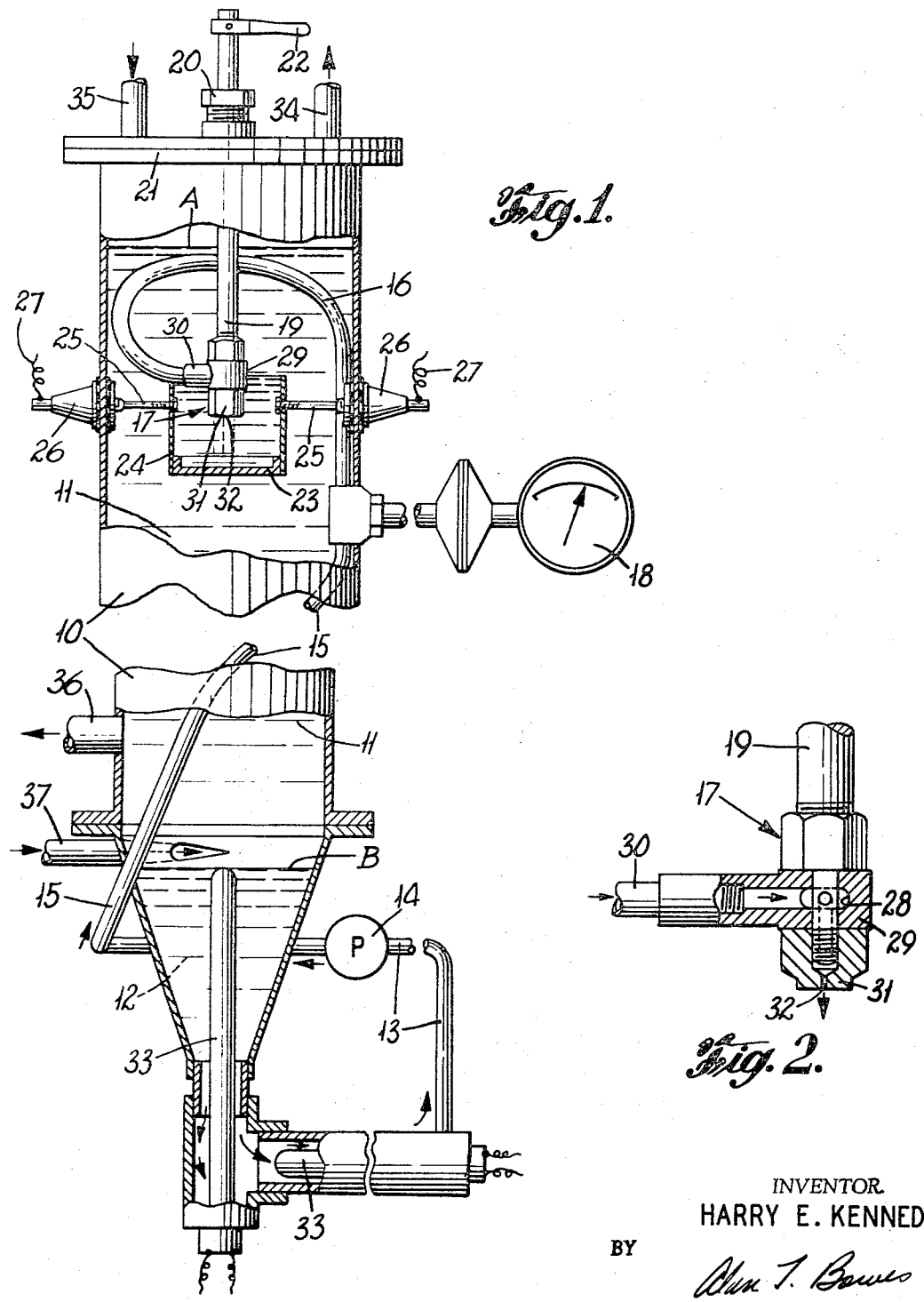

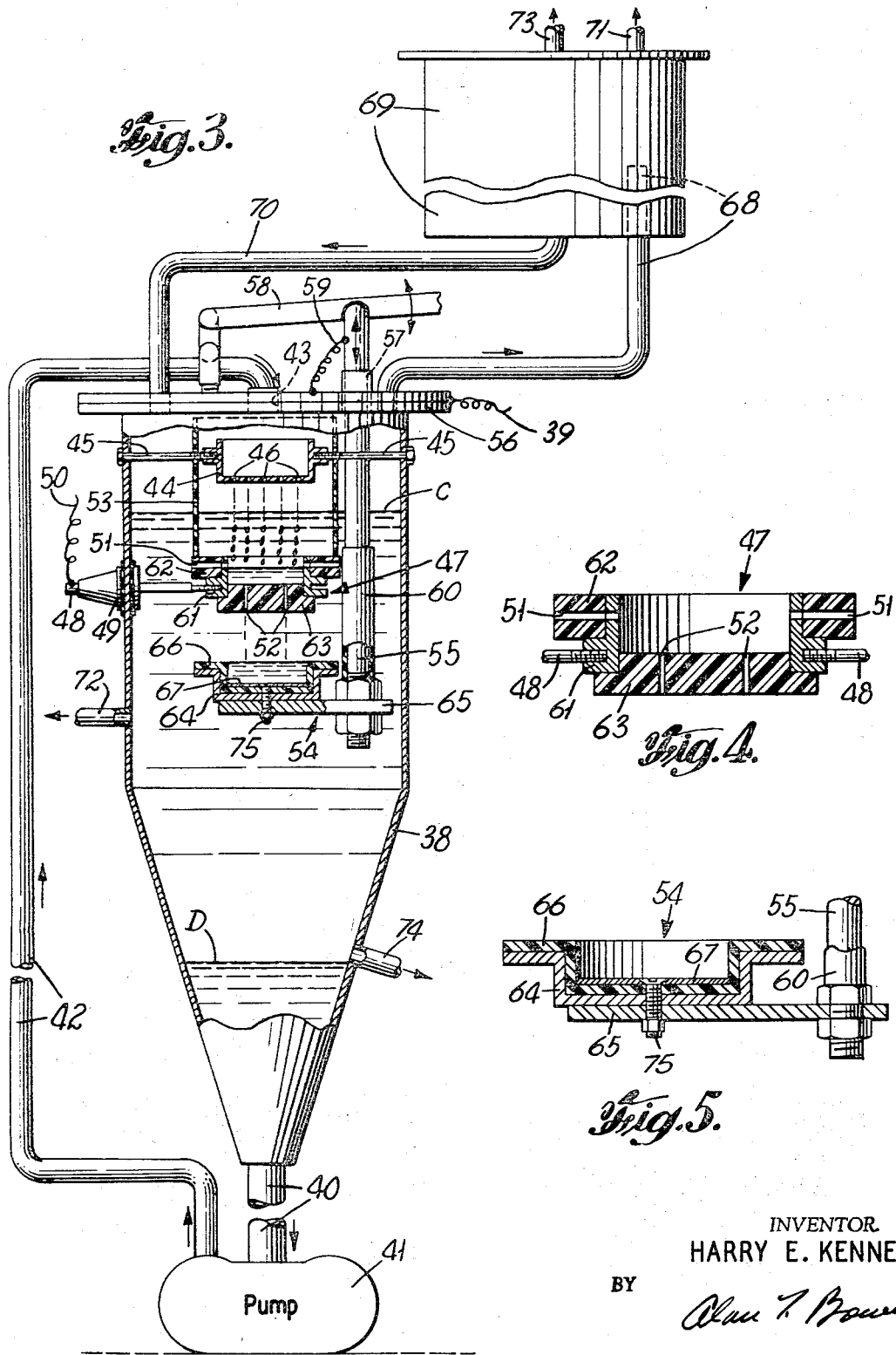

INVENTOR.
HARRY E. KENNEDY
BY
*Alan T. Bowes*
ATTORNEY

United States Patent Office 3,373,099
Patented Mar. 12, 1968

3,373,099
PROCESS OF CRACKING LIQUID HYDROCARBONS IN AN ELECTRIC ARC USING LIQUID METAL ELECTRODES
Harry E. Kennedy, Berkeley, Calif., assignor to Union Carbide Corporation, a corporation of New York
Filed Mar. 24, 1965, Ser. No. 442,270
3 Claims. (Cl. 204—171)

This invention relates to the conversion of hydrocarbons. More particularly, this invention relates to the production of acetylenes and other gases by the decomposition of hydrocarbons in an electric arc process.

This application is an improvement of my process disclosed and claimed in U.S. Patent 3,169,915, issued Feb. 16, 1965.

Because of its high reactivity, acetylene is greatly valued for welding and chemical synthesis. The economic production of acetylene has been the subject of extensive research and development for many years.

Acetylene was first produced commercially by the calcium carbide process. Calcium carbide is costly to ship and the acetylene yield is only about 0.4 pound of acetylene per pound of calcium carbide. Large acetylene plants using calcium carbide are usually adjacent to the carbide furnaces, which must be located in areas where limestone, coal and electricity are available in large quantities. The disposal of the byproduct lime from such a process presents a serious problem.

Acetylene can also be obtained directly from hydrocarbons by decomposition in an electric arc. Two such methods have some commercial interest: the Schoch Electric Discharge Process of the University of Texas Bureau of Industrial Chemistry, and the Von Ediger Process, which is described in U.S. Patent 2,632,731.

The Schoch process employs a "rotary blower electrode" to decompose hydrocarbons in the vapor phase in an electric arc discharge. It has not been used commercially because the acetylene content of the cracked gas is low, high voltages are needed and the rotary electrode is expensive to build and operate.

The Von Ediger process yields high acetylene concentrations by exposing liquid hydrocarbons to intermittent electric arcs generated between electrically conductive particles supported loosely in shallow layers on an electric grid beneath the liquid. The electric grid is composed of carbon electrodes, which are parallel rods of alternate polarity. Current having a potential of 300 to 1,000 volts is passed from one rod through the conductive particles to an adjacent rod. Small, intermittent arcs are thus formed between the loose particles. The cracked gas formed in one of these arcs "blows" the conductive particle away and the arc is extinguished.

The Von Ediger process has not found commercial use, probably because of excessive erosion of the conducting particles and electrodes.

The primary object of this invention is to produce acetylene economically by electric arc cracking of fluid hydrocarbons in a continuous process.

It is a further object of this invention to provide electric arc electrodes which are self-restoring and non-destructible.

Other objects and advantages of this invention will appear from the following description and appended claims.

According to this invention, a process for converting hydrocarbons comprises surrounding liquid electrodes with fluid hydrocarbons, and cracking the fluid hydrocarbons by striking intermittent electric arcs between the liquid electrodes.

The liquid electrodes of this invention may be composed of any suitable electrically-conductive liquid, such as liquids of low-melting metals or alloys. Exemplary of such conductive liquids are liquid mercury, lead, tin and Woods metal, the latter being a low-melting eutectic alloy generally composed of lead, tin and bismuth. More specific descriptions of this latter alloy can be found in almost any well-known technical handbook, as for example Perry's "Chemical Engineers Handbook," 1950 edition.

While any of these conductive liquids may be employed, the use of two liquid electrodes of mercury is preferred for the practice of this invention. This is because mercury is a liquid at ambient temperature and, as an element, is of invariant composition. Moreover, its relatively low boiling point permits separation by vaporization from some process or reaction mixtures such as heavy carbon sludges or very heavy oils.

While the liquid mercury electrodes may be formed by or employed in any suitable manner, the procedure most preferred for this invention is that in which one of the liquid electrodes, in the form of a pressured jet or stream, passes into the other electrode, which is in the form of a liquid pool. This arrangement has been found to give a smooth-burning arc with the character most satisfactory to provide steady, smooth operation, high cracked gas production, and high acetylene yields and power efficiencies. Because of its dimensional stability, the arc is easy to adjust and to maintain at optimum operating temperatures.

When electrodes of this type are employed, it is particularly desirable that the polarity of the liquid pool be negative with respect to the jet. By operating in this manner higher gas yields and improved power efficiencies are obtained. Although the arc serves as a rectifier for AC power, it is difficult to maintain a uniform polarity. For example, the polarity of the pool will remain constant for a period of from 5 seconds up to one minute or more and then will change. While the use of smooth bore nozzles, elevated mercury pressures and longer jet lengths tend to improve the stability of the pool at negative polarity, it is generally necessary to supply direct current to the electrodes to maintain the desired polarity.

Within the limits of practicality, any fluid hydrocarbon can be cracked by the process of this invention. However, this invention is particularly applicable to cracking those liquid hydrocarbons associated with or obtainable from petroleum. These include the crude petroleum oil itself, straight run or cracked naphtha, natural gasoline, kerosene or diesel or fuel oils. These liquid hydrocarbons can be cracked by an arc submerged in the hydrocarbon, if desired, but improved gas yields and power efficiencies are obtained when the liquid hydrocarbon is sprayed into the arc.

Gaseous feed stocks can also be cracked by the process of this invention. Exemplary of those gaseous feed stocks usable in the practice of this invention are those comprised of the natural gas hydrocarbons such as methane, ethane, propane and butane; the lower alkenes such as ethylene, propylene and butylene; and some of the lower boiling components of natural gasoline that can be vaporized and cracked in the gas phase, such as pentane, hexane, and heptane.

The reaction conditions of the process of this invention also vary widely. For example, the process of this invention can be carried out at pressures of from about 5 p.s.i. absolute to about 65 p.s.i. absolute and at temperatures of from room or ambient to that of the boiling point of the hydrocarbon to be cracked. In addition, the voltage of the arc formed between the electrodes can vary from 100 to more than 5,000 volts, while the current employed in the process of this invention can be either alternating with frequencies of between 25 and 60 or higher cycles, or direct current.

However, for the practice of this invention a pressure of between 2 p.s.i.g. and 10 p.s.i.g. and a temperature of between 150° C. and 350° C. are preferred for commercial usages. Similarly, a voltage of about 1,000 volts and a direct current are also preferred.

It is to be understood that these preferred reaction conditions are relative and will vary according to such factors as efficiency desired and type of hydrocarbon feed. For example, should it be desirable to maintain the reaction at the hottest possible level, the reaction temperature is limited by the boiling point of the mercury electrodes, i.e., 357° C. and the boiling point of the hydrocarbon oil. Similarly, for pilot or experimental processes as shown in the examples which follow, pressures of about atmospheric or the like may be employed.

The invention will now be discussed in detail by reference to the drawings, in which:

FIG. 1 is a partially cross-sectional, elevational view of one form of apparatus for practicing the invention.

FIG. 2 is a cross-sectional, elevational view of the liquid metal nozzle used in the apparatus of FIG. 1.

FIG. 3 is a partially cross-sectional, elevational view of another embodiment of the apparatus for practicing the invention.

FIG. 4 is a cross-sectional, elevational enlargement of the high voltage receiver shown in FIG. 3.

FIG. 5 is a cross-sectional, elevational enlargement of the ground receiver shown in FIG. 3.

Figure 6:
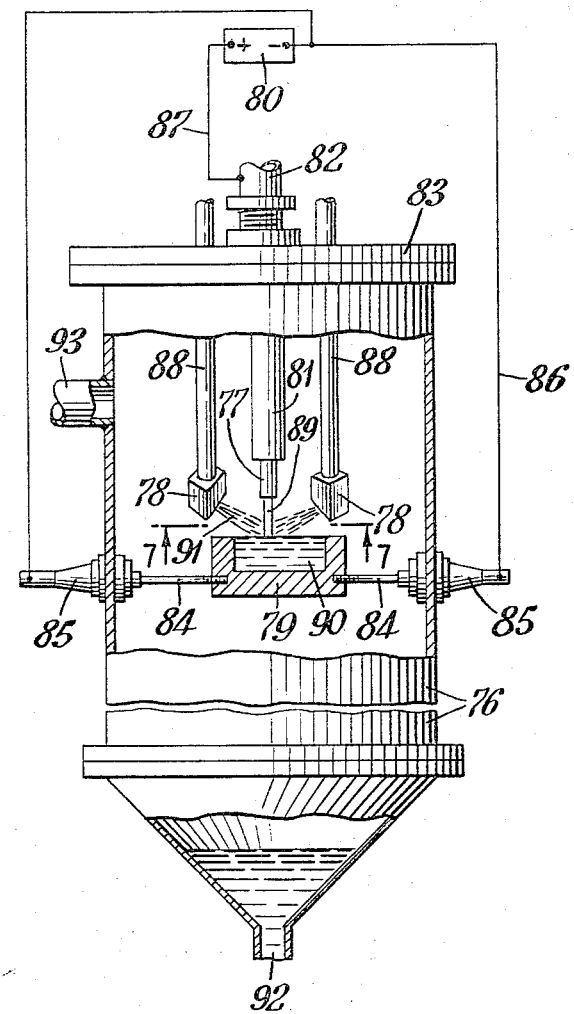
FIG. 6 is a partially cross-sectional, elevational view of a particularly preferred embodiment of the apparatus for practicing the invention.

Referring now to FIG. 1, the preferred apparatus for practicing the invention includes a metal reactor 10 containing a hydrocarbon liquid oil 11 maintained at the level A and floating on an electrically conductive liquid 12 maintained at the level B. The reactor 10 and all metal parts connected thereto are grounded to a supporting metal frame, not shown, which is connected to the ground side of the electric arc circuit by an electric cable.

Conductive liquid 12 in the base of the reactor passes through suction pipe 13, enters pump 14 and is pumped through discharge pipe 15, the upper portions 16 of which is flexible metallic tubing. The flexible discharge pipe 16 is attached to a jet nozzle 17 through which a jet of conductive liquid issues downward into the reactor. Diaphragm pressure gauge 18 indicates the pressure in the flexible discharge tubing 16. The nozzle 17 is supported by a movable rod 19, which passes through a packing gland 20 in the top flange 21 of the reactor. A handle 22 attached to the movable rod 19 is useful in adjusting the nozzle 17 up or down.

The conductive liquid is ejected from the nozzle 17 downward into the hydrocarbon liquid 11 in which the nozzle is immersed. The conductive liquid falls into a metal receiver 23, hereafter referred to as the "hot" cup, which is supported by metal strips 24 bolted to metal studs 25. The studs are welded to the tips of automotive spark plugs 26, which are screwed into metal bosses in the wall of the reactor. Thus, the spark plugs 26 support the "hot" cup 23 and electrically insulate it from the grounded metal reactor and conductive liquid nozzle 17. Electric cables 27 connect the spark plugs to the high voltage side of the electric arc circuit so that an electrical potential can be applied between the "hot" cup and the electrically-grounded, descending stream of conductive metal liquid.

The jet nozzle 17 is shown in detail in FIG. 2. Conductive liquid enters a chamber 28 in the metal distributor piece 29 through inlet 30 and passes to nozzle tip 31. The liquid leaves the nozzle through a small orifice 32, .015 inch to .050 inch or larger in diameter.

Conductive liquid entering the "hot" cup 23 forms a pool therein and overflows through the hydrocarbon liquid 11 to the cone at the base of the reactor 10, thus completing its flow cycle through the apparatus.

The apparatus of FIG. 1 may be used with any electrically conductive liquid metal or alloy, such as mercury or Woods metal. For example, electrical resistance heating strips (not shown) can be fastened to the external walls of the reactor and sheathed electric heating tubes 33 in the conductive liquid piping can be used to raise the temperature of Woods metal contained in the reactor to its melting point of about 70° C. to 75° C.

If an electrical potential of 100 or 1,000 volts, for example, is applied between the high voltage cable 27 and the cable to which the reactor 10 is grounded, electric current will pass between the conductive liquid stream issuing from the jet nozzle 17 and the conductive liquid in the "hot" cup 23 below. When the length of the metal stream from the nozzle to the cup is properly adjusted by moving the nozzle, an electric arc or arcs will strike in the hydrocarbon liquid between the conductive liquid droplets in the bottom part of the falling stream. If the nozzle 17 is sufficiently raised, the electric circuit can be broken. Conversely, a short-circuit can be obtained by lowering it sufficiently.

The conductive liquid descending from the nozzle 17 through the oil is broken into a stream of falling droplets by the shearing action of the oil. Each droplet is surrounded by a film of oil which resists the flow of electric current. When the length of the stream of droplets is properly adjusted, their combined resistance can be bridged by the voltage across the "hot" cup and the jet nozzle, and an electric arc or arcs will strike. The arc vaporizes and decomposes some of the surrounding hydrocarbon liquid and, if this liquid is fuel or crude oil, or kerosene, then acetylene, hydrogen, carbon black (finely divided carbon), and small amounts of other hydrocarbons, such as methane and ethylene will be formed. The rapid, almost explosive formation of hot gases vaporizes and blows apart the conductive liquid stream and extinguishes the arcs struck. The surrounding oil then quenches the gases, cools them rapidly to the oil temperature of, for example, 100° C. to 200° C. and they pass upward to the surface of the oil. Rapid quenching is essential if high acetylene concentration is desired in the cracked gas. As the formed gases pass upward, additional conductive liquid approaches the pool in the "hot" cup and new arcs are struck.

When a study is made of voltage and current variations in the arc circuit with an oscilloscope, the extremely brief contact times devoted to arcing and reaction quenching are readily apparent. Both arcing and quenching occur in less than .005 second, and probably in less than .001 second.

Most of the carbon black remains in the hydrocarbon liquid but some will pass upwardly with the formed gases. Referring again to FIG. 1, the cracked gas, essentially acetylene and hydrogen, leaves the reactor through the outlet pipe 34 and passes to a condenser and entrainment separator (not shown) where it is cooled and vaporized oil is removed before the gas enters gas metering and sampling equipment. Oil from the condenser and entrainment separator drains back to the reactor through return pipe 35. Acetylene in the cooled, cracked gas can be recovered in any of several gas scrubbing systems familiar to those versed in the art.

Most of the carbon black formed settles to the bottom of the reactor where it is withdrawn as a mixture of oil and sludge through the outlet 36. The sludge is removed in equipment not shown and the recovered oil is returned to the reactor through the tangential inlet pipe 37. Conductive liquid entrained in the carbon sludge can be recovered and returned to the reactor and the carbon can be recovered for sale.

The reactor is provided with auxiliary connections, not shown, for the measurement of pressure, temperature, liquid level, etc. Multiple streams of conductive liquid may be utilized instead of only a single stream as shown in FIG. 1.

Another embodiment of the invention is illustrated by the apparatus shown in FIG. 3. In FIG. 3, the metal reactor 38 contains the liquid hydrocarbon oil which is to be decomposed. The reactor 38 and all metal parts connected to it are connected to the ground side of the electric arc circuit by electric cable 39. The level of the liquid hydrocarbon is maintained at C, and the level of the electrically conductive liquid is maintained at D. The hydrocarbon floats on the conductive liquid in the conical section of the reactor 38.

The conductive liquid at the bottom of the reactor 38 flows through suction pipe 40 and into pump 41, from which it is pumped upward through pipe 42 and enters the top of the reactor through pipe nipple 43. The mercury then falls into a metal receiver 44, hereinafter referred to as the circuit-breaker cup, which is supported from the top walls of the reactor by metal studs 45. The bottom of the cup is perforated with a multiplicity of holes 46, which can be 0.030 inch to 0.80 inch in diameter, or larger. The mercury passes through the holes 46 and falls in small streams to a second receiver 47 below, hereinafter referred to as the "hot" cup.

The "hot" cup 47 comprises a metal frame which supports shielding material made of a temperature-resistant electrically insulating substance such as a tetrafluoroethylene polymer. Cup 47 is shown in detail in FIGURE 4 and will be more fully described later.

The "hot" cup 47 is supported by metal studs, one of which is shown at 48, passing through the metal side walls of reactor 38 and electrically insulated from the reactor walls by ceramic insulator 49. The metal supporting stud 48 can conduct an electric potential to the "hot" cup 47 and to the conductive liquid within it. Electric cables, one of which is shown at 50, supply current to the studs of 100 to 1,000 volts or higher.

The distance between cups 44 and 47 is such that the falling mercury streams are broken into mercury droplets by the shearing action of the oil through which the streams must fall. The dielectric strength of oil surrounding these droplets is high enough so that electric current will not be conducted between the circuit-breaker cup 44 and the "hot" cup 47.

The bottom of the "hot" cup 47 is constructed of an electrically insulating plastic such as a tetrafluoroethylene polymer and is perforated with a multiplicity of holes 52. There are fewer holes in the bottom of the "hot" cup 47 than in the bottom of the circuit-breaker cup 44 and the sides of the "hot" cup contain overflow holes 51. These allow a constant head of conductive liquid to be maintained above the hole 52 in the bottom of the "hot" cup 47 without the necessity of fine adjustment of the pumping rate.

A shielding tube 53 surrounds the space above the circuit-breaker cup 44 and the space between cup 44 and the "hot" cup 47. The tube 53 prevents some of the finely divided carbon formed in the reaction from entering either cup and plugging the holes. This tube can be made of a temperature-resistant, electrically insulating plastic such as a tetrafluoroethylene polymer.

The high voltage conductive liquid falls in streams through the hydrocarbon to a receiver 54 below, hereinafter referred to as the ground cup. The ground cup 54 has a metal frame and a shielding liner of a temperature-resistant, electrically insulating material, and will be more fully described later. The metal frame of the ground cup is bolted to and supported by a movable metal rod 55 which passes through the reactor cover flanges 56, through packing gland 57 and is fastened to the lever arm 58. A ground cable 59 connects the metal rod to the main ground cable 39. The ground cup 54 can be raised or lowered by movement of the lever 58, so as to adjust the distance between the "hot" cup 47 and the ground cup 54.

Conductive liquid streams falling from the "hot" cup 47 will fill the ground cup 54 since the bottom of the ground cup is unperforated. Conductive liquid will then flow over the sides of the ground cup and fall to the bottom of the reactor 38, at liquid level D.

The internal bottom of the ground cup 54 is a metal plate which is bolted to the metal frame of the cup with a metal screw 75 so that the metal plate and the conductive liquid within the cup are at ground potential with regard to the electric arc circuit. The lower part of the supporting rod 55 is shielded by a tube 60 of a temperature-resistant, electrically insulating material to prevent any possibility of prematurely grounding the high voltage conductive liquid streams falling from the "hot" cup 47.

FIGURE 4 shows possible details of the "hot" cup 47 but operability of the invention is not limited to the particular embodiment shown.

In FIGURE 4, the circular frame 61 is made of a strong, electrically conductive material such as steel. It contains grooves into which metal support studs 48 can be tightened so as to conduct electric current into the "hot" cup and thus to the conducive liquid contained in the cup. The upper rim 62 of the "hot" cup is a circular ring made of a high temperature-resistant, electrically-insulating material and the bottom 63 of the cup is made of a similar material. The bottom 63 of the cup contains holes 52 of about 0.030 inch to 0.080 inch in diameter and through which the conductive liquid streams fall to the ground cup below. The upper rim and bottom of the cup, being non-conductive, are not eroded by stray arcing which might occur from spattering of the mercury liquid above or below the "hot" cup. The side holes 51, which can be 0.100 inch to 0.200 inch in diameter, permit excess conductive liquid to overflow to the bottom of the reactor.

The ground cup 54, shown in detail in FIG. 5, has general features similar to the "hot" cup except that the conductive liquid leaves the ground cup by flowing over its sides. The circular frame 64 is made of a strong, electrically conductive material such as steel, and is bolted to a supporting plate 65 and rod 55 of the same material. The frame 64 is shielded by a liner 66 of temperature-resistant, electrically insulating material. A circular metal plate 67 covers the inside bottom of the cup and is exposed to the conductive liquid contained therein. The metal support rod 55 is connected to the ground side of the electric circuit and the conductive liquid within the cup is thereby also grounded through metal plate 67 and metal screw 75 to the supporting plate 65.

In the operation of the invention as exemplified in the apparatus just described, mercury, for example, is pumped through the system and an electrical potential of 100 to 1,000 volts is applied across the high-voltage cable 50 and the ground cable 39. The current will pass through the mercury streams falling from the "hot" cup 47 to the ground cup 54 and an electric arc or arcs will strike between the falling mercury droplets and the mercury pool in the ground cup when the distance between the two cups is properly adjusted. If the ground cup is raised sufficiently, a short-circuit will occur and if it is lowered, the electric circuit will be broken.

An electric arc is formed when the lengths of the mercury streams falling through the hydrocarbon breaks the streams into mercury droplets whose resistance when surrounded by the hydrocarbon is equivalent to a spark gap which can be bridged by the impressed voltage to form an electric arc. The arc vaporizes and decomposes some of the surrounding hydrocarbon to form acetylene, hydrogen, carbon black (finely divided carbon), and small amounts of lower molecular weight hydrocarbons, such as ethylene. The explosive formation of the hot gases extinguishes the arc and the surrounding oil rapidly cools the gases to the oil temperature, which can be 40° C. to 200° C. This rapid quenching is vital to the production of high acetylene concentrations in the cracked gas. The cooled gases bubble upward to the surface of the oil, additional falling mercury droplets approach the grounded mercury in the ground cup 54, other arcs are struck and the process is repeated.

Some of the very fine carbon black formed stays in the gas which bubbles to the surface of the oil, but most of the carbon remains in the oil. The cracked gas, which is mostly acetylene and hydrogen, leaves the reactor 38 through gas outlet pipe 68 and enters the entrainment trap 69. Entrained oil, if any, returns to the reactor through drain line 70 and the cracked gases leave the trap through the gas outlet line 71 to gas metering and sampling equipment and an acetylene recovery system (not shown).

The reactor and entrainment trap are provided with auxiliary tap connections such as 72 and 73 for the measurement of pressure, temperature, liquid level, etc. A drain tap 74 is provided on the lower side of the reactor for the removal of an oily carbon-mercury sludge which forms during the operation. This sludge can then be treated for mercury and carbon recovery.

The reactor described above can produce cracked gas containing at least 30% acetylenes when cracking kerosene oil, or heavier oils such as crude oil or fuel oil, at atmospheric pressure, temperatures of 40° C. to 200° C. and impressed voltages of 200 volts to 600 volts with 60 cycle AC current. Under reduced pressures of from 5 to 10 pounds per square inch absolute, the reactor has produced cracked gas containing at least 33% acetylenes.

The voltages, pressures and temperature previously set forth are by way of preference only, and it is to be understood that the invention will operate under other conditions. For example, pressures above or below atmospheric can be used and temperatures up to within a few degrees of the boiling point of the hydrocarbon oil may be employed. Direct current or alternating current with any frequency may be used and a wide range of voltages can be used, although best results are obtainable with potentials over 100 volts.

Acetylenes obtainable in the cracked gas decrease below 30% where lower molecular weight oils are cracked. For example, heptane produces 27% acetylenes under conditions at which kerosene will give 30% acetylenes.

Where lube oil or kerosene is cracked, about half the carbon is removed as acetylene, one-fourth to one-third as higher acetylene homologs and ethylene, one-tenth as carbon black and the rest as methane and other hydrocarbon gases. Typical results for these two feed stocks are tabulated below:

|  | Yield on Carbon Basis, Weight percent | |
| --- | --- | --- |
|  | Lube Oil | Kerosene |
| Acetylene | 47 | 45 |
| Ethylene | 12 | 15 |
| Higher acetylene, such as vinyl and diacetylene | 12 | 16 |
| Carbon black | 13 | 7 |
| Rest [1] | 16 | 7 |
| Total | 100 | 100 |

[1] Mostly methane, and $C_3$ and $C_4$ hydrocarbons.

Contact trays may be used as a means of contact between the conductive liquid electrode and the conductive liquid pool instead of the apparatus arrangement shown in FIG. 3. Also, intersecting mercury streams, one stream being at ground potential and the other at an elevated voltage, can be used. Also, a metal or carbon rod in intermittent contact with a pool or stream of mercury, or a mercury stream falling onto a metal or carbon electrode give satisfactory results. As indicated previously, other low-melting metals such as lead, tin or low-melting eutectic alloys such as Woods metal can be used as the conductive liquid instead of mercury.

Figure 7:
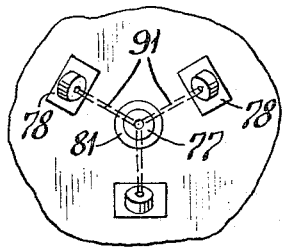
FIG. 7 is a cross-sectional view of the apparatus shown in FIG. 6 and taken along the line 7—7 of FIG. 6.

With reference to FIGURES 6 and 7 a particularly preferred form of apparatus for practicing the process of this invention comprises essentially metal reactor 76, conductive liquid feed nozzle 77, liquid hydrocarbon feed nozzle 78, metal receiver or "hot" cup 79 and DC power supply 80.

Conductive liquid feed nozzle 77 is supported by movable tube 81, which passes through packing gland 82 in top flange 83 of reactor 76. Movable tube 81 is supplied with means, not shown, for raising and lowering tube 81 and nozzle 77 to adjust the distance between nozzle 77 and "hot" cup 79.

"Hot" cup 79 is supported by metal studs 84, which in turn are welded to the tips of automotive spark plugs 85, which are screwed into metal bases in the wall of reactor 76. Thus, spark plugs 85 support "hot" cup 79 and electrically insulate it from metal reactor 76 and conductive liquid nozzle 77.

Electric cables 86 connect spark plugs 85 to the negative side of D.C. power supply 80. The positive side of D.C. power supply 80 is connected by cable 87 to movable tube 81, thus completing the electrical circuit.

Liquid hydrocarbon feed nozzles 78 are supported by tubes 88 which pass through top flange 83 of reactor 76. Nozzles 78 are so positioned that the liquid hydrocarbon spray is directed into the arc region formed between conductive liquid jet 89 and conductive liquid pool 90. Although any spray nozzle can be employed, such as one which provides a conical spray pattern, it is preferred that the nozzle be one which concentrates the spray in the arc region for maximum cracking efficiency. One suitable type is one which forms a fan 91, the plane of which is in the plane of conductive liquid jet 89.

In operation, an electric potential of from about 100 to about 1,000 volts is applied across nozzle 77 and "hot" cup 79. Conductive liquid, for example, mercury, is fed under elevated pressure, generally 20 p.s.i.g. to 500 p.s.i.g., and preferably 50 p.s.i.g. to 120 p.s.i.g., through movable tube 81 and nozzle 77 to form jet 89, which is of a length such that the jet breaks into droplets at or slightly above the surface of pool 90, causing arcing at the surface of the pool or slightly above. Liquid hydrocarbon is fed through tubes 88 spray nozzles 78 and into the arc region where it is cracked. Excess conductive liquid and uncracked liquid hydrocarbon overflow "hot" cup 79 and fall to the bottom of reactor 76 and are withdrawn through line 92. After separation the conductive liquid and liquid hydrocarbon are recycled to reactor 10 through tube 81 and tube 88, respectively. Cracked gases are removed from reactor 76 through line 93.

The invention may be further illustrated by the following examples. Alternating current, when employed, was 60 cycle alternating current.

EXAMPLE 1

1.5 gallons (10 pounds) of liquid kerosene was charged to an apparatus of the type shown in FIGURE 1. Two liquid mercury electrodes were employed, one of the liquid electrodes being sprayed as a pressure jet into the other electrode which was in the form of a pool. The kerosene feed was disposed about the liquid electrodes. A pressure of 0.2 p.s.i.g. and a temperature of 120° C. was maintained within the reactor. An intermittent electric arc was thereupon struck between the electrodes, the arc gap being 1¼ inches measured from the tip of the jet nozzle employed to the mercury pool below. To form the arc an impressed voltage of 450 volts and an arc current of 50 to 60 amperes were used.

After being subjected to intermittent arcs for a period of approximately 30 minutes, 1.1 pounds of the kerosene feed was found to be cracked. Carbon and hydrogen balances were used to calculate the weight of oil decomposed per cubic foot of cracked gas. The oil consumption was then calculated from the cracked gas rate which was 50 cubic feet per hour. The following units were calculated from a sample analysis of the cracked gas using carbon-hydrogen balances and are tabulated below:

TABLE I

| Cracking products | Vol., percent | Yield Per Pound of Kerosene | |
|---|---|---|---|
| | | Pound | Cubic Ft. |
| Hydrogen | 49.8 | .059 | 11.4 |
| Methane | 4.6 | .043 | 1.1 |
| Acetylene | 26.6 | .411 | 6.1 |
| Ethylene | 7.9 | .131 | 1.8 |
| Ethane | 0.7 | .012 | 0.2 |
| Methyl acetylene | 1.2 | .028 | 0.3 |
| Propylene | 2.1 | .052 | 0.5 |
| Propane | 0.2 | .005 | |
| Diacetylene | 3.5 | .103 | 0.8 |
| Vinyl acetylene | 0.6 | .018 | 0.1 |
| Butadiene | 1.0 | .032 | 0.2 |
| Butenes | 0.9 | .030 | 0.2 |
| C₅'s and higher | 0.9 | .037 | 0.2 |
| Carbon (calculated) | | .039 | |
| Total | 100.0 | 1.000 | 22.9 |

EXAMPLE 2

1.5 gallons (11 pounds) of heavy lube oil was charged to an apparatus of the type shown in FIGURE 1. A pressure jet of liquid mercury, was sprayed into a liquid mercury pool in the manner described heretofore, thereby forming two liquid mercury electrodes. The feed stock of heavy lube oil was disposed about the liquid electrodes. A pressure of 0.4 p.s.i.g. and a temperature of 190° C. was maintained within the reactor. An intermittent electric arc was thereupon struck between the electrodes, the arc gap being 1½ inches measured from the tip of the jet nozzle employed to the mercury pool below. To form the arc an impressed voltage of 450 volts and an arc current of 40 amperes was used. After being subjected to intermittent arcs for a period of approximately 30 minutes, 0.75 pound of the heavy lube oil feed was found to be cracked. Carbon and hydrogen balances were used to calculate the weight of oil decomposed per cubic foot of cracked gas. Then the oil consumption was calculated from the cracked gas rate which was 35 cubic feet per hour. The results obtained are tabulated below:

TABLE II

| Cracking products | Vol., percent | Yield Per Pound of Lube oil cracked | |
|---|---|---|---|
| | | Pound | Cubic Ft. |
| Hydrogen | 54.7 | .068 | 13.2 |
| Methane | 3.7 | .037 | 0.9 |
| Acetylene | 27.8 | .449 | 6.7 |
| Ethylene | 6.5 | .114 | 1.6 |
| Ethane | 0.3 | .006 | 0.1 |
| Methyl acetylene | 0.9 | .022 | 0.2 |
| Propylene | 1.2 | .032 | 0.3 |
| Propane | | | |
| Diacetylene | 2.8 | .088 | 0.6 |
| Vinyl acetylene | 0.5 | .016 | 0.1 |
| Butadiene | 0.5 | .017 | 0.1 |
| Butenes | 0.4 | .014 | 0.1 |
| C₅'s and higher | 0.7 | .031 | 0.2 |
| Carbon (Calculated) | | .106 | |
| Total | 100.0 | 1.000 | 24.1 |

EXAMPLE 3

1.5 gallons (10 pounds) of liquid kerosene was charged to an apparatus of the type shown in FIGURE 1. A pressure jet of liquid Woods metal was sprayed into a liquid Woods metal pool in the manner described heretofore, thereby forming two liquid Woods metal electrodes. The feed stock of liquid kerosene was disposed about the liquid electrodes. Atmospheric pressure and a temperature of 120° C. was maintained within the reactor. An intermittent electric arc was thereupon struck between the electrodes, the arc gap being 1 inch measured from the tip of the jet nozzle employed to the Woods metal pool below. To form the arc an impressed voltage of 400 volts and an arc current of 20 to 30 amperes was used.

After being subjected to intermittent arcs the kerosene feed was found to be cracked at the rate of 0.45 pound per hour. Cracked gas analysis and carbon and hydrogen balances were used to calculate the weight of kerosene decomposed per cubic foot of cracked gas formed. Then the kerosene consumption rate was calculated from the cracked gas rate, which was 10 cubic feet per hour. The results obtained are tabulated below:

TABLE III

| Cracking products | Vol., percent | Yield Per Pound of Kerosene Cracked | |
|---|---|---|---|
| | | Pound | Cubic Ft. |
| Hydrogen | 48.7 | .056 | 10.9 |
| Methane | 4.9 | .045 | 1.1 |
| Acetylene | 27.1 | .406 | 6.1 |
| Ethylene | 10.0 | .162 | 2.2 |
| Ethane | 0.8 | .014 | 0.2 |
| Propylene | 2.5 | .060 | 0.6 |
| Propane | 0.2 | .005 | 0.1 |
| C₄'s and higher ¹ | 5.8 | .179 | 1.3 |
| Carbon (calculated) | | .073 | |
| Total | 100.0 | 1.000 | 22.5 |

¹ Mostly unsaturates.

EXAMPLE 4

1.5 gallons (10 pounds) of liquid kerosene was charged to an apparatus of the type shown in FIGURE 1. A pressure jet of liquid Woods metal was sprayed into a liquid Woods metal pool in the manner described heretofore, thereby forming two liquid Woods metal electrodes. The feed stock of liquid kerosene was disposed about the liquid electrodes. A pressure of 0.2 p.s.i.g. and a temperature of 170° C. was maintained within the reactor. An intermittent electric arc was thereupon struck between the electrodes, the arc gap being 1 inch measured from the tip of the jet nozzle employed to the Woods metal pool below. To form the arc an impressed voltage of 400 volts and an arc current of 60 to 80 amperes was used.

After being subjected to intermittent arcs the kerosene feed was found to have been cracked at the rate of 2.0 pounds per hour. Cracked gas analysis and carbon and hydrogen balances were used to calculate the weight of kerosene decomposed per cubic foot of cracked gas formed. Then the kerosene consumption rate was calculated from the cracked gas rate which was 40 cubic feet per hour. The results obtained are tabulated below:

TABLE IV

| Cracking products | Vol., percent | Yield Per Pound of Kerosene Cracked | |
|---|---|---|---|
| | | Pound | Cubic Ft. |
| Hydrogen | 43.3 | .045 | 8.7 |
| Methane | 9.8 | .081 | 2.0 |
| Acetylene | 19.3 | .259 | 3.9 |
| Ethylene | 14.4 | .209 | 2.9 |
| Ethane | 0.8 | .012 | 0.2 |
| Propylene | 4.5 | .098 | 0.9 |
| Propane | 0.3 | .007 | 0.1 |
| C₄'s and higher ¹ | 7.6 | .209 | 1.5 |
| Carbon (calculated) | | .080 | |
| Total | 100.0 | 1.000 | 20.2 |

(¹) Mostly unsaturates.

EXAMPLE 5

11 gallons (80 pounds) of liquid heavy lube oil was charged to an apparatus of the type shown in FIGURE 1, but having increased holding capacity. A pressure jet of liquid mercury was sprayed into a liquid mercury pool in the manner described heretofore, thereby forming two liquid mercury electrodes. The feed stock of liquid heavy lube oil was disposed about the liquid electrodes. An atmospheric pressure and a temperature of about 125° C. was maintained within the reactor. An intermittent electric arc was thereupon struck between the electrodes, the arc gap being 1 inch measured from the tip of the jet nozzle employed to the mercury pool below. To form the arc an impressed voltage of 360 volts and an arc current of 100 amperes was used.

After being subjected to intermittent arcs for a period of approximately 60 minutes, 5.3 pounds of the heavy lube oil feed was found to be cracked. The weight of oil decomposed per cubic foot of cracked gas was calculated from a cracked gas analysis using carbon and hydrogen balances. Then the lube oil consumption was calculated from the cracked gas rate, which was 120 cubic feet per hour. The results obtained are tabulated below:

TABLE V

| Cracking products | Vol., Percent | Yield Per Pound of Lube Oil Cracked | |
|---|---|---|---|
| | | Pound | Cubic Feet |
| Hydrogen | 51.9 | .061 | 11.8 |
| Methane | 4.9 | .045 | 1.1 |
| Acetylene | 27.4 | .421 | 6.3 |
| Ethylene | 7.7 | .127 | 1.8 |
| Ethane | 0.4 | .007 | 0.1 |
| Methyl acetylene | 0.9 | .021 | 0.2 |
| Propylene | 1.5 | .037 | 0.3 |
| Propane | 0.2 | .005 | |
| Diacetylene | 2.0 | .059 | 0.5 |
| Vinyl acetylene | 0.5 | .015 | 0.1 |
| Butadiene | 0.8 | .026 | 0.2 |
| Butenes | 0.6 | .020 | 0.1 |
| $C_5$'s and higher | 1.2 | .050 | 0.3 |
| Carbon (calculated) | | .106 | |
| Total | 100.0 | 1.000 | 22.8 |

EXAMPLE 6

5.7 pounds of propane vapor was charged to an apparatus of the type shown in FIGURE 1, but having increased holding capacity and an inlet tube surrounding the pressure jet nozzle. A pressure jet of liquid mercury was sprayed into a liquid mercury pool in the manner described heretofore, thereby forming two liquid mercury electrodes. The feed stock of propane vapor was fed into the inlet tube so that it was guided across and disposed about the liquid electrodes. Atmospheric pressure and a temperature of 50–100° C. was maintained in the reactor.

After being subjected to intermittent arcs for a period of approximately 75 minutes, 3.5 pounds of the propane vapor was found to be cracked. The weight of propane vapor decomposed per cubic foot of cracked gas was calculated from a cracked gas analysis using carbon and hydrogen balances. Then the propane consumption was calculated from the cracked gas rate which was 93 cubic feet per hour. The results obtained are tabulated below:

TABLE VI

| Cracking products | Vol., Percent | Yield Per Pound of Propane Feed | |
|---|---|---|---|
| | | Pound | Cubic Ft. |
| Hydrogen | 44.0 | .046 | 8.9 |
| Methane | 5.4 | .044 | 1.1 |
| Acetylene | 20.9 | [1] .281 | [1] 4.2 |
| Ethylene | 6.3 | [2] .092 | [2] 1.3 |
| Ethane | 1.1 | .017 | 0.2 |
| Methyl acetylene | 0.7 | .015 | 0.1 |
| Propylene | 1.5 | .033 | 0.3 |
| Propane | 17.3 | [3] .393 | [3] 3.5 |
| Diacetylene | 1.3 | .034 | 0.3 |
| Vinyl acetylene | 0.4 | .011 | 0.1 |
| Butadiene | 0.4 | .011 | 0.1 |
| Butenes | 0.3 | .009 | 0.1 |
| $C_5$'s and higher | 0.4 | .014 | 0.1 |
| Carbon (calculated) | | [4] | |
| Total | 100.0 | 1.000 | 20.3 |

[1] Acetylene yield per pound of propane decomposed was 0.462 pound and 6.9 cubic feet.
[2] Ethylene yield per pound of propane decomposed was 0.152 pound and 2.1 cubic feet.
[3] Propane decomposition was 60.7%.
[4] Negligible.

Another quantity of kerosene was charged to an apparatus as shown in FIGURE 3. However, the circuit breaker cup 44, the "hot" cup 47 and the ground cup 54 were removed and replaced by a ¼ inch by 6 inch tungsten rod. The metal rod electrodes were adjusted vertically by the movable rod 55 to which they were fastened. A mercury pool electrode was employed and was located in the cone at the bottom of the reactor 38.

Two runs were thereupon made. In the second run, the mercury pool was vibrated with a thin, stainless steel diaphragm activated by a solenoid vibrator. The results are tabulated below:

TABLE VII

| | EXAMPLE | |
|---|---|---|
| | 7 | 8 |
| Electrode Description: | | |
| Ground electrodes | Mercury pool | Mercury pool.[1] |
| "Hot" electrodes | ¼" x 6" tungsten rod.[2] | ¼" x 6" iron rod.[2] |
| Voltage: | | |
| Impressed | 1,130 | 820. |
| Arc | 400–600 | 700–800. |
| Arc current, Amps | 4 (avg.) | 2 (avg.). |
| Reactor Conditions: | | |
| Pressure, p.s.i.g | 0.1 | 0.1. |
| Temperature, °C | 45–50 | 45–55. |
| Electrode Conditions: | | |
| Arc gap, inches | ⅛ | ⅛. |
| Electrode consumption, inches/hr | 0.2 | 0.04. |
| Feed Stock: | | |
| Type | Kerosene | Kerosene. |
| Amount charged, pounds | 7 | 7. |
| Consumption of Feed: | | |
| Amount, pounds | .14 | .13. |
| Rate, pounds/hr | .04 | .035. |
| Cracked Gas: | | |
| Amount, Cubic Feet | 3 | 2.3. |
| Rate, Cubic feet/hr | 0.9 | 0.8. |
| Acetylenes in Cracked gas, percent | 27 | 31. |

[1] Vibrated.
[2] Vertical and adjustable.

EXAMPLE 9

11 gallons (80 pounds) of liquid heavy lube oil was charged to an apparatus of the type shown in FIGURE 1 but having increased holding capacity. A pressure jet of liquid mercury was sprayed into a liquid mercury pool in the manner described heretofore, thereby forming two liquid mercury electrodes. However, in this example, the grounded mercury electrode was suspended above the surface of the oil while only the mercury pool in the "hot" cup was submerged below the surface. Hence, the mercury stream passed through the oil vapors above the oil and then down into the liquid before entering the mercury pool. The following results were obtained and are tabulated below:

TABLE VIII

| Jet Nozzle: | |
|---|---|
| Type and size | Steel, .030" diam. |
| Position relative to oil surface | Tip was 1½" above surface. |
| Arc gap, inches [1] | 3. |
| Mercury pressure, p.s.i.g | 55. |
| Length of test, minutes | 70. |
| Voltage: | |
| Impressed | 360. |
| Arc | 240. |
| Arc current, amps | 100. |
| Reactor conditions: | |
| Pressure | Atmospheric. |
| Temperature, °C | 125° C. (approx.). |
| Feed stock consumed: | |
| Rate, pounds/hr.[2] | 5.5. |
| Amount, pounds [2] | 6.4. |
| Cracked gas: | |
| Rate, c.f.h. | 120. |
| Total amount, cu. ft. | 140. |

| Cracking products [3] | Vol., Percent | Yield Per Pound of Oil Cracked | |
|---|---|---|---|
| | | Pound | Cubic Ft. |
| Hydrogen | 51.5 | .059 | 11.3 |
| Methane | 6.6 | .060 | 1.5 |
| Acetylene | 23.7 | .349 | 5.2 |
| Ethylene | 10.0 | .159 | 2.2 |
| Ethane | 0.5 | .009 | 0.1 |
| Methyl Acetylene | 1.0 | .022 | 0.2 |
| Propylene | 1.8 | .043 | 0.4 |
| Propane | 0.1 | .002 | |
| Diacetylene | 1.5 | .043 | 0.3 |
| Vinyl Acetylene | 0.4 | .012 | 0.1 |
| Butadiene | 0.9 | .028 | 0.2 |
| Butenes | 0.6 | .019 | 0.1 |
| $C_5$'s | 0.9 | .036 | 0.2 |
| $C_6$'s | 0.5 | .022 | 0.1 |
| Carbon (calculated) [3] | | .137 | |
| Total | 100.0 | 1.000 | 22.0 |

[1] Arc gap is total distance from tip of jet nozzle to the mercury liquid pool below.
[2] The oil consumption was not measured directly. The weight of oil decomposed per cubic foot of cracked gas was calculated from the cracked gas analysis using carbon and hydrogen balances. Then the lube oil consumption was calculated from the measured cracked gas rate.
[3] Calculated by carbon and hydrogen balances.

EXAMPLE 10

Employing apparatus and procedure similar to those described in Example 1 and shown in FIG. 1, except that the power supply was a DC supply, kerosene was cracked in two different runs, with different "hot" cup polarities. The results of these runs are summarized in Table IX.

TABLE IX

|  | Run |  |
|---|---|---|
|  | 1 | 2 |
| Polarity of "hot" cup | (¹) | (²) |
| Voltage: |  |  |
|   Impressed | 490 | 480 |
|   Arc | 150 | 150–80 |
| Arc current, amps | 120 | 110 |
| Cracked gas, ft.³/hour | 180 | 110–120 |
| Percent acetylenes | 24.5 | 24 |
| Power Usage: |  |  |
|   Watt hr./ft.³ gas | 105 | 123 |
|   Watt hr./ft.³ acetylenes | 430 | 510 |

¹ Negative.
² Positive.

As can be seen from the data presented in Table IX, higher gas production rates and power efficiencies are obtained when the "hot" cup is negative rather than positive.

EXAMPLE 11

Employing apparatus similar to that shown in FIG. 6, kerosene in the form of a mist was cracked employing both AC and DC power supplies. The results of these runs are summarized in Table X.

TABLE X

| Run | 1 | 2 | 3 |
|---|---|---|---|
| Power Source | (¹) | (¹) | (²) |
| "Hot" cup polarity | (³) | (⁴) |  |
| Impressed voltage | 950 | 950 | 950 |
| Arc current | 60 | 60 | 60 |
| Cracked Gas: |  |  |  |
|   Ft.³/hour | 170 | 130 | 130 |
|   Percent acetylenes | 27.5 | 27 | 27.5 |
| Power usage: |  |  |  |
|   Watt hr./ft.³ acetylenes | 345 | 390 | 385 |
|   KWH/lb. acetylenes | 5.1 | 5.8 | 5.7 |

¹ D.C.
² A.C.
³ Negative.
⁴ Positive.

As is readily apparent, the use of direct current and a negative "hot" cup when cracking hydrocarbon mists is superior to the use of alternating current or direct current with a positive "hot" cup, both as to gas yields and power efficiency. When Run 1 of this example and Run 1 of Example 10 are compared it can be seen that the use of a spray to the arc instead of an arc submerged in liquid hydrocarbon also provides improved gas yields and power efficiencies.

What is claimed is:

1. A process for cracking liquid hydrocarbons which comprises directing a stream of electrically conductive liquid downward toward a pool of electrically conductive liquid, said pool being at a negative potential in relation to said stream, forming an electric arc in the region where said stream contacts said pool and introducing liquid hydrocarbon to the region of said arc.

2. The process as claimed in claim 1 wherein said arc is submerged in liquid hydrocarbon.

3. The process as claimed in claim 1 wherein said liquid hydrocarbon is introduced into said arc region in the form of a spray.

References Cited

UNITED STATES PATENTS 3,169,915   2/1965   Kennedy           204—171

ROBERT K. MIHALEK, *Primary Examiner.*